United States Patent [19]

Baker et al.

[11] Patent Number: 4,971,228

[45] Date of Patent: Nov. 20, 1990

[54] GRAIN STREAM DAMPER DEVICE

[76] Inventors: Bruce L. Baker, R.R. #1, Box 128, Ohio City, Ohio 45874; Richard L. Miller, R.R. #2, Convoy, Ohio 45832

[21] Appl. No.: 404,335

[22] Filed: Sep. 7, 1989

[51] Int. Cl.[5] .............................................. B65D 5/72
[52] U.S. Cl. .................................. 222/491; 222/517; 222/558; 222/564; 239/500; 137/527.6
[58] Field of Search ............... 222/491, 517, 564, 558, 222/461, 462; 193/9; 198/534; 137/527.6; 138/45, 46; 414/291, 299; 239/508, 500, 502, 506, 513

[56] References Cited

U.S. PATENT DOCUMENTS

| | | |
|---|---|---|
| 388,164 | 8/1888 | Whitney ............................... 222/517 |
| 1,040,392 | 10/1912 | Ogle et al. .................... 137/527.6 X |
| 1,996,098 | 4/1935 | Chase ................................ 239/500 X |
| 3,390,918 | 7/1968 | Reinke . |
| 3,881,610 | 5/1975 | Hessling . |
| 4,061,221 | 12/1977 | Higashinaka et al. . |
| 4,067,460 | 1/1978 | Schwarz . |
| 4,182,591 | 1/1980 | Stanelle . |
| 4,270,671 | 6/1981 | Arnold ............................. 222/558 X |
| 4,399,931 | 8/1983 | Maddalena ....................... 222/564 X |
| 4,548,342 | 10/1985 | Fisher .............................. 222/564 X |

Primary Examiner—Andres Kashnikow
Assistant Examiner—Gregory L. Huson
Attorney, Agent, or Firm—Jeffers, Hoffman & Niewyk

[57] ABSTRACT

A damper device for dampening a grain stream flowing from a discharge end of a spout has an adjustable band for mounting on the spout, a bucket for surrounding the grain stream and composed of a pair of main deflector members located at a first pair of opposite sides of the grain stream, a pair of supplementary and auxiliary deflector members located at each of a second pair of opposite sides of the grain stream in orthogonal relation to the first pair of stream sides, and a support arrangement suspending the main, supplementary and auxiliary deflector members from the mounting band. The support arrangement pivotally mounts the main deflector members to extend below the spout and across the grain stream for impact with grain flowing from the spout and biases the main deflector members for movement toward and away from one another between contracted and expanded relations in response to absence and presence of the grain stream flowing from the spout. The support arrangement also mounts the supplementary and auxiliary deflector members to extend along the main deflector members and therebelow and into the grain stream from third and fourth opposing sides of the grain stream oriented in orthogonal relation to the first and second sides thereof for impact with grain flowing from the bucket.

20 Claims, 3 Drawing Sheets

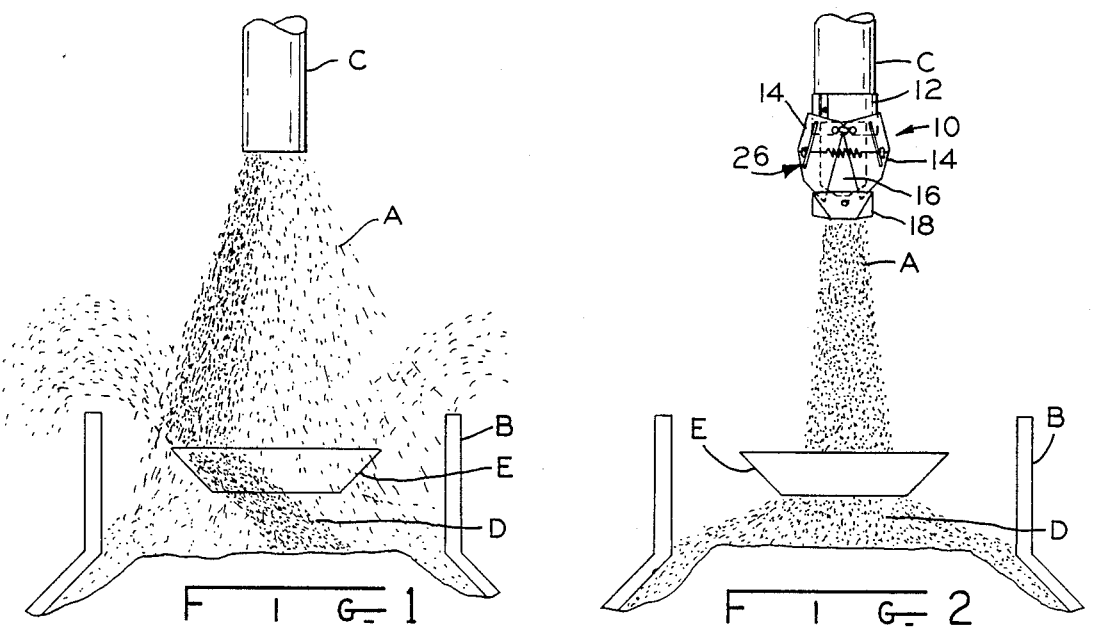
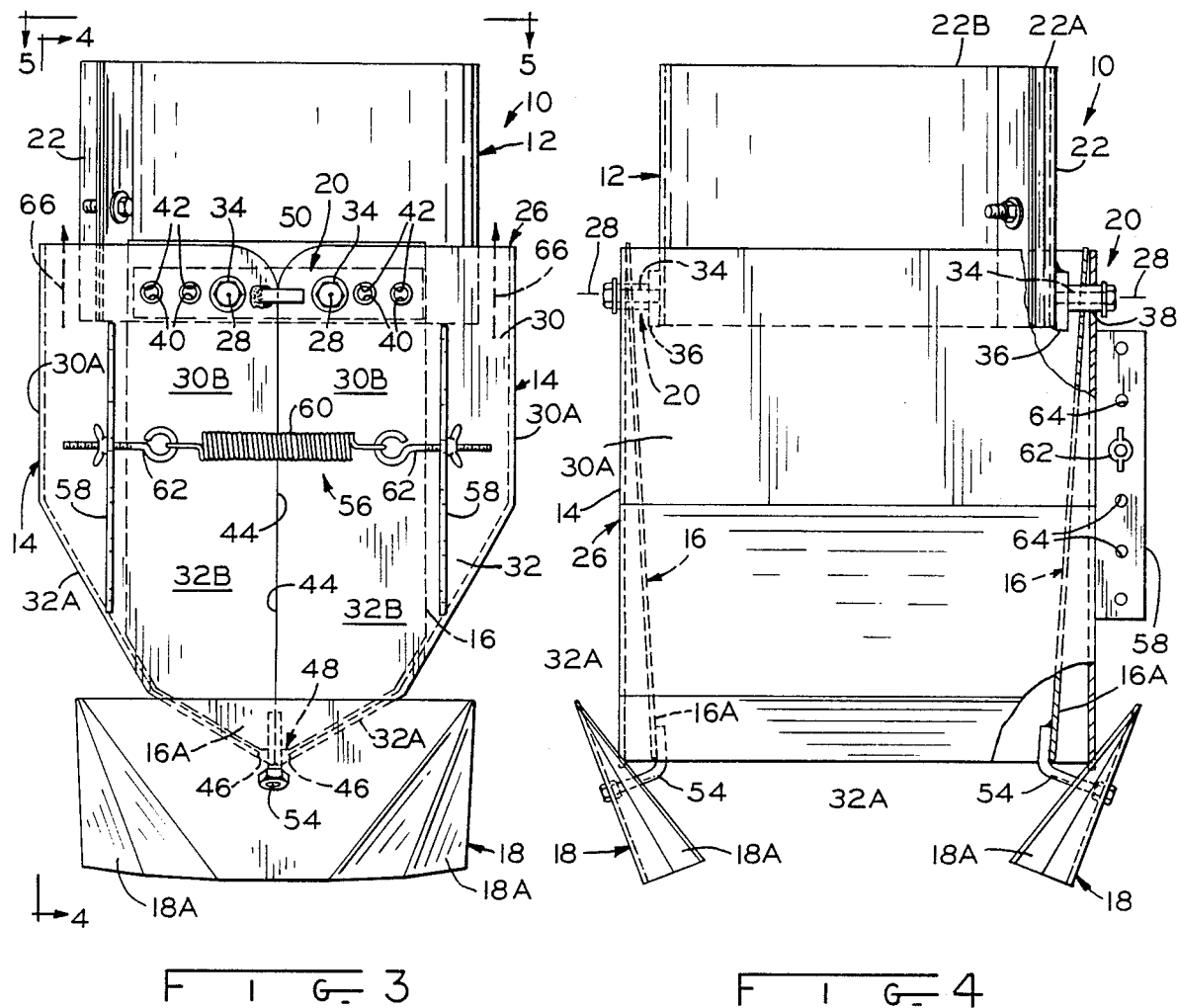

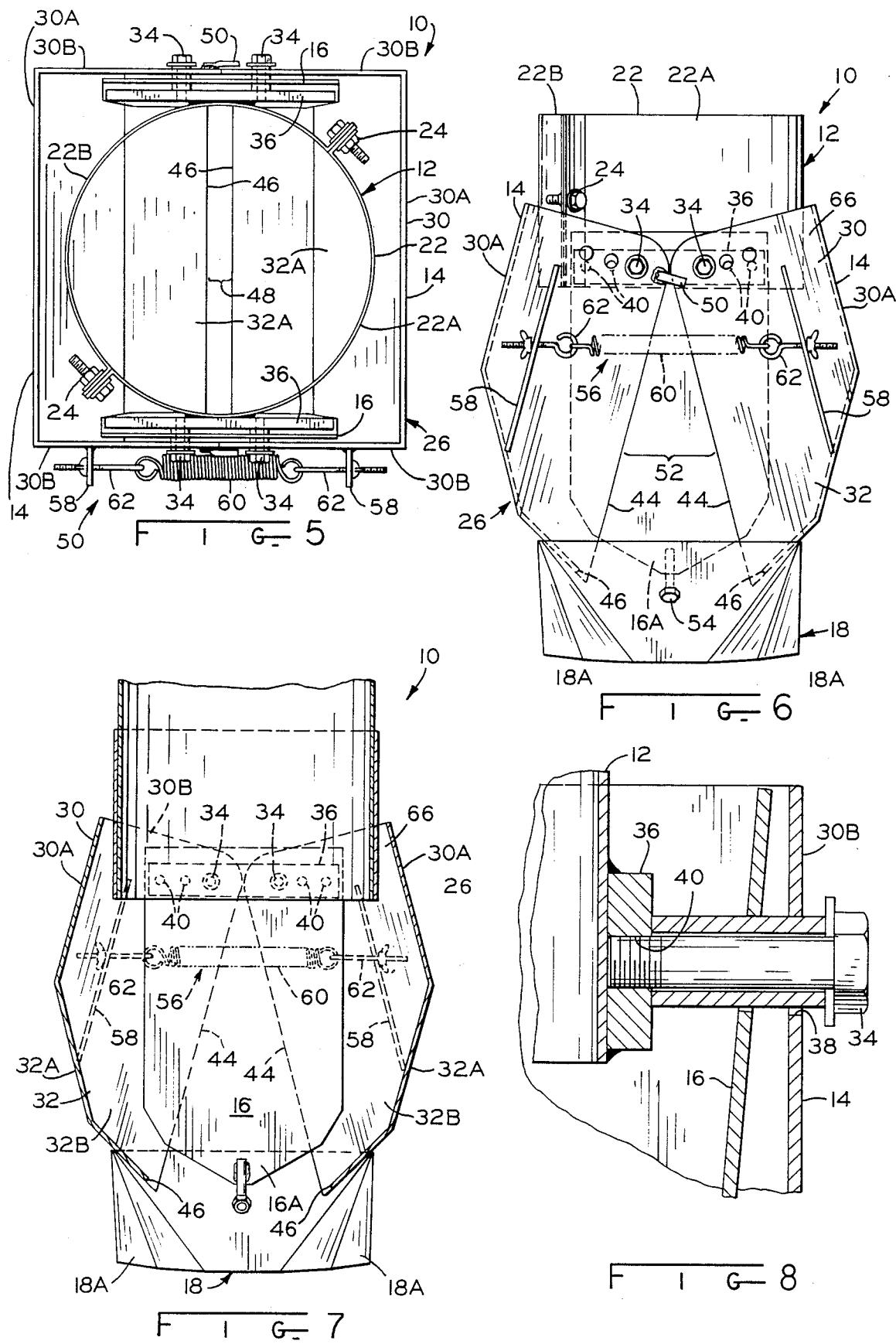

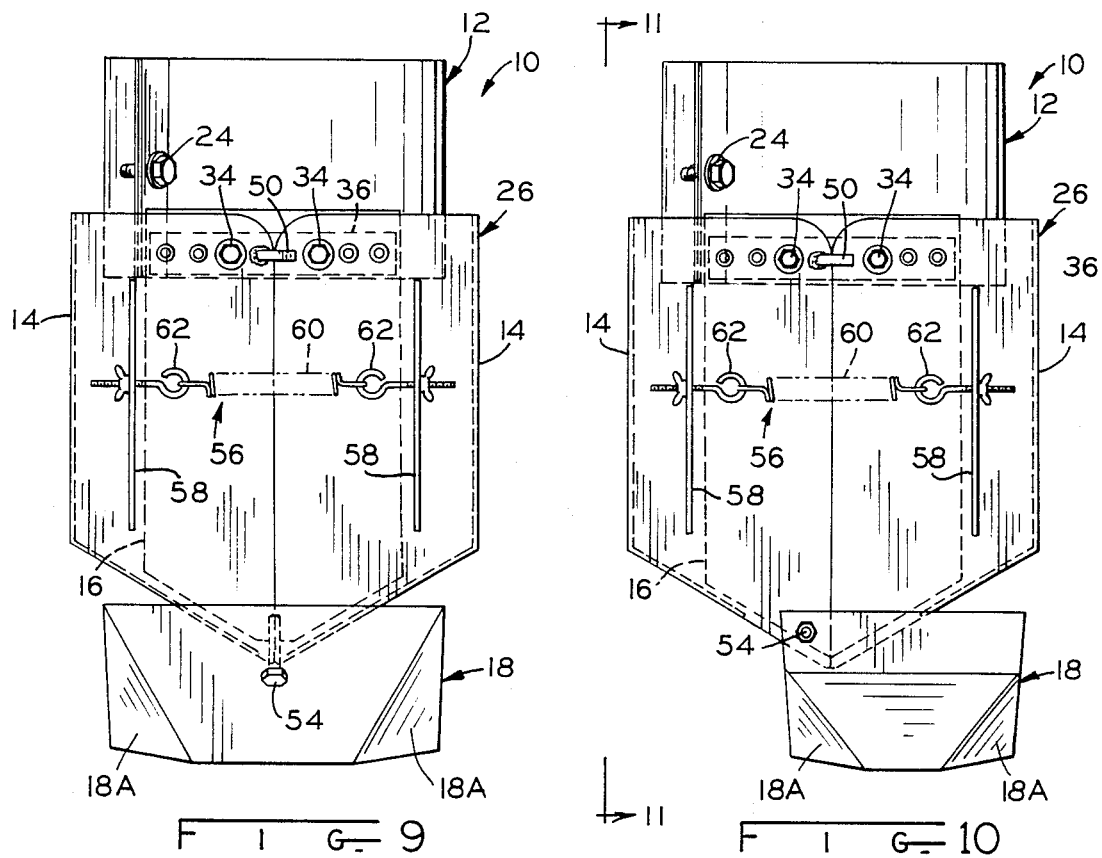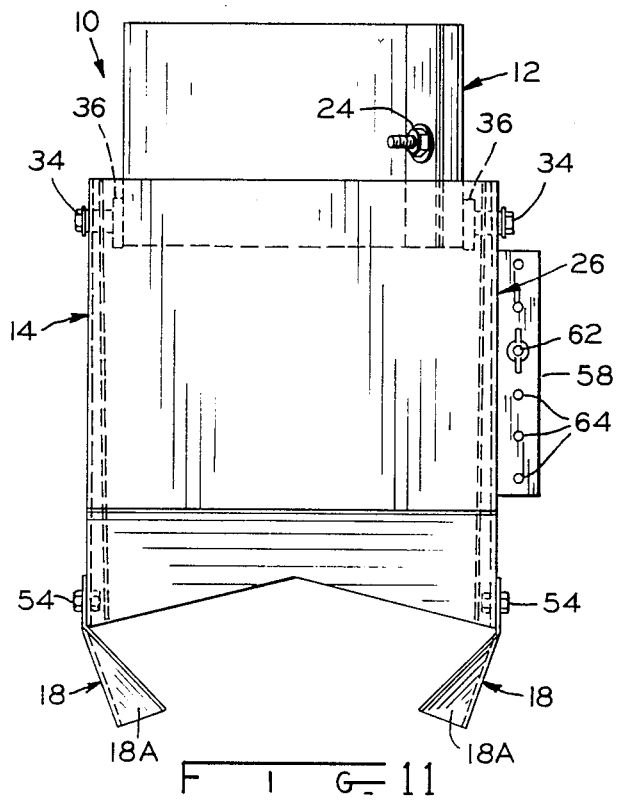

GRAIN STREAM DAMPER DEVICE

BACKGROUND OF THE INVENTION

The present invention generally relates to grain handling systems and, more particularly, to a grain damper device that controls a stream of grain flowing from a discharge spout.

A common problem with most conventional grain handling systems is that the grain discharges from a spout at high velocity and almost never in the center of the spout. The drawback of high velocity is that it causes the stream of grain flow to spread as the grain emerges from the spout and the grain to bounce and scatter out from whatever it happens to contact.

Conventional handling systems utilize a grain spreader which is generally located about 6-8 inches below the top edge of the grain bin. The grain spreader receives the grain from a spout and then spreads the grain throughout the bin by imparting rotary motion to the stream of grain. Grain spreaders may be either powered by a motor or may operate by means of the force of the grain stream which causes the spreading device to rotate. The problem with prior art systems has been that the grain stream which comes out of the spout will not be a uniform stream but will have grain quantities skewed to one side. Furthermore, the stream will be a diverging stream so that much of the grain will not hit the center of the spreader but instead will bounce and scatter outside of the grain spreader. When loading grain onto a wagon or truck, the problem is accentuated and the grain tends to hit and bounce off of the load and onto the ground, especially as the vehicle becomes nearly full. Similarly, when the discharge spout is mounted over a grain bin using a grain spreader at its inlet, the high velocity of the grain stream causes the grain to spread and hit different parts of the grain spreader and either bounce away from the bin or scatter into the bin causing an unlevel condition therein Almost all grain spreaders require that the grain discharging from the spout fall into the center of the spreader in order for the spreader to do an effective job of spreading the grain evenly in the bin. The grain discharging from a conventional grain spout almost never falls through the center of the spout and usually not through the same sector within the spout all of the time. As a result, the conventional grain spreader seldom does an effective job of evenly leveling the grain. The failure to distribute the grain evenly within the bin is not because the spreader is defective but because the stream of grain discharging from the spout spreads and thus the grain does not fall into the center of the spreader Consequently, a need exists for an approach to overcoming these problems with conventional grain handling systems without introducing a set of new ones in their place.

SUMMARY OF THE INVENTION

The present invention provides a grain stream damper device designed to satisfy the aforementioned needs. The damper device of the present invention controls the stream, and reduces the velocity, of grain flowing from a discharge spout so as to minimize the spreading of grain as it leaves the spout and reduce grain bouncing, scattering and uneven filling. The grain stream damper device also provides air flow passages adjacent the grain flowing from the discharge spout which induce updrafts that separate and route dust and dirt from the grain upwardly into the atmosphere away from the load being accumulated as well as away from the persons working in the area.

Accordingly, the present invention is directed to a damper device for dampening a grain stream flowing from a discharge end of a grain delivery spout The damper device comprises: (a) an adjustable means for mounting on the discharge end of the grain spout: (b) a bucket for surrounding the grain stream and being composed of a pair of main deflector members; (c) a pair of auxiliary deflector members; and (d) a support arrangement for mounting the main and auxiliary deflector members from the adjustable mounting means. The support arrangement includes first means connected to the adjustable mounting means and pivotally mounting the main deflector members of the bucket to extend below the discharge end of the grain spout and across the grain stream from first and second opposing sides thereof for impact by grain flowing from the spout, and to bias the main deflector members for movement toward one another to a contracted relation in absence of the grain stream flowing from the spout while permitting movement of the main deflector members away from one another toward an expanded relation in response to forces imposed thereon by impact with the grain stream flowing from the spout. The support arrangement also includes second means connected to either the first means of the support arrangement or the main deflector members of the bucket and mounting the auxiliary deflector members to extend below the main deflector members of the bucket and into the grain stream from third and fourth opposing sides of the grain stream oriented in orthogonal relation to the first and second sides thereof for impact by grain flowing from the bucket.

More particularly, the main deflector members of said bucket include respective upper and lower portions. The respective upper portions of the main deflector members extend substantially parallel along and about the grain stream flowing from the spout when the main deflector members are in the contracted relation. The respective lower portions of the main deflector members converge toward one another across the grain stream flowing from the spout when the main deflector members are in the contracted relation.

Also, the damper device includes a pair of side plates located at the second pair of opposite sides of the grain stream with the auxiliary deflector members. The support arrangement also mounts the side plates to extend along the main deflector members and prevent flow of grain therefrom at the third and fourth opposing sides of the grain stream when the main deflector members are moved toward their expanded relation in response to impact with grain flowing from the spout.

Optionally, biasing means in the form of anchor elements and a yieldably stretchable member, such as a coil spring, can be attached to the main deflector members to assist in biasing them toward their contracted relation.

These and other features and advantages of the present invention will become apparent to those skilled in the art upon a reading of the following detailed description when taken in conjunction with the drawings wherein there is shown and described an illustrate embodiment of the invention.

BRIEF DESCRIPTION OF THE DRAWINGS

In the course of the following detailed description, reference will be made to the attached drawings in which;

FIG. 1 is a schematic representation of a stream of grain flowing at high velocity into a grain storage bin from a conventional discharge spout, showing the grain stream spreading as it emerges from the spout and grain bouncing and scattering upon impact with the grain spreader.

FIG. 2 is a schematic representation similar to that of FIG. 1, but showing the grain stream damper device of the present invention mounted to the discharge spout and minimizing grain stream spreading and reducing grain bouncing and scattering.

FIG. 3 is an enlarged side elevational view of the grain stream damper device of FIG. 2, showing the device contracted to a minimum open condition.

FIG. 4 is an end elevational view of the damper device as seen along line 4—4 of FIG. 3.

FIG. 5 is a top plan view of the damper device as seen along line 5—5 of FIG. 3.

FIG. 6 is a side elevational view of the damper device similar to FIG. 3, but showing the device expanded away from its minimum open condition.

FIG. 7 is a longitudinal axial sectional view of the damper device of FIG. 6.

FIG. 8 is an enlarged fragmentary longitudinal axial sectional view of the upper right portion of the damper device seen in FIG. 4.

FIG. 9 is a side elevational view similar to FIG. 3, but showing a modified form of the damper device.

FIG. 10 is a side elevational view similar to FIG. 9, but showing another modified form of the damper device.

FIG. 11 is an end elevational view of the damper device as seen along line 11—11 of FIG. 10.

DETAILED DESCRIPTION OF THE INVENTION

Referring now to the drawings, and particularly to FIG. 1, there is shown a schematic representation of a stream of grain A flowing at high velocity into a grain storage bin B from a conventional discharge spout C. As described in the background section supra, the grain stream A undesirably spreads as it emerges from the spout C and grain which does not properly hit the center of spreader E bounces and scatters upon impact with the perimeter of the grain spreader E. D represents the grain stream as it emerges from the spreader E. FIG. 2 is another schematic representation similar to FIG. 1 but showing the grain stream damper device of the present invention, generally designated 10, mounted to the discharge spout C. The damper device 10 serves to dampen and slow the velocity of the grain stream A and confine and condense the grain stream A as it emerges from the spout C, thereby minimizing spreading of the grain stream A and reducing bouncing and scattering of the grain upon impact with spreader E.

Turning now to FIGS. 3-5, there is shown in greater detail the grain stream damper device 10 of the present invention. In its basic components, the damper device 10 includes adjustable mounting means 12, a pair of main deflector members 14, a pair of supplementary deflector members 16, a pair of auxiliary deflector members 18 and an support arrangement 20 for mounting the deflector members 14-18 from the adjustable mounting band 12. The adjustable mounting means 12 is in the form of a split circular band 22 formed of two semi-circular sections 22A, 22B and a plurality of releasable fasteners 24 for tightening the band sections 22A, 22B together in clamping relation about the discharge end of the spout C.

The pair of main deflector members 14 form a clam shell-type split bucket 26 configured for surrounding and intersecting the flowing grain stream A. Considering that the grain stream A has four sides angularly spaced approximately 90 degrees, or first and second orthogonally-oriented pairs of opposite sides, then the main deflector members 14 are located primarily at the first pair of opposite sides of the grain stream A. They are of substantially identical construction and positioned as mirror images of one another. They are also pivotable toward and away from one another about generally parallel axes 28 between a contracted relation (see FIGS. 3 and 5) and an expanded relation (see FIGS. 6 and 7).

The pairs of supplementary and auxiliary deflector members 16, 18 are located primarily at the second pair of opposite sides of the grain stream A and being oriented in orthogonal relation to the first pair of stream sides. The deflector members 16, 18 thus assist the main deflector members 14 in confining and condensing the grain stream A at all four sides thereof so as to prevent spreading and scattering of the grain.

More particularly, each main deflector member 14 of the damper device 10 includes an upper portion 30 and a lower portion 32. When the main deflector members 14 are in their contracted relation, the upper portions 30 extend substantially parallel along and about the grain stream A. On the other hand, the lower portions 32 converge toward one another across the grain stream A so as to be impacted by the falling grain.

Each upper portion 30 of the main deflector members 14 includes an end wall 30A and a pair of side walls 30B connected at the opposite edges of the end wall 30A. The end walls 30A of the upper portions 30 are disposed at the first pair of opposite sides of the grain stream and extend substantially parallel to one another. The pairs of side walls 30B of the upper portions 30 are disposed respectively at the second pair of opposite sides of the grain stream. The side walls 30B of each pair extend substantially perpendicularly to respective end wall 30A and parallel to one another. Further, the side walls 30B of one pair extend substantially coplanar with the corresponding side walls 30B of the other pair. Together, as seen in FIG. 5, the end walls 30A and side walls 30B provide the upper portions 30 with an overall rectangular configuration when the main deflector members 14 are in their contracted relation.

Each lower portion 32 of the main deflector members 14 includes a bottom wall 32A and a pair of side walls 32B connected at the opposite edges of the bottom wall 32A. The pairs of side walls 32B of the lower portions 32 extend substantially perpendicularly to the respective end walls 32A and merge with and are continuations of the pairs of side walls 30B of the corresponding upper portions 30. However, the bottom walls 32A of the lower portions 32 are connected to but extend at angles from the end walls 30A of the upper portions 30 so as to converge downwardly and inwardly toward one another at the first pair of sides of the grain stream. In such construction, the bottom walls 32A provide the lower portions 32 with a tapered configuration when the main deflector members 14 are in their contracted relation The bottom walls 32A of the embodiment shown in FIGS. 3-7 have an intermediate bend therein, whereas the bottom walls 32A of the embodiment shown in FIGS. 9 and 10 have none.

As mentioned previously, the support arrangement 20 of the damper device 10 suspends the respective main, supplementary and auxiliary deflector members 14-18 from the mounting band 22. Basically, the support arrangement 20 pivotally mounts the main deflector members 14 of the split bucket 26 to extend below the spout C and across the grain stream A for impact with the grain stream. The main deflector members 14 are biased by gravity, due to the offset location of their pivotal mounting axes 28 from their centers of gravity, for movement toward one another into their contracted relation in the absence of any significant amount of grain in the stream A flowing from the spout C into the split bucket 26.

More particularly, as seen in FIGS. 3-8, the support arrangement 20 includes pairs of studs 34 fastened to mounting bars 36 attached on opposite sides of the mounting band 12 corresponding to the second pair of opposite sides of the grain stream A. The studs 34 are aligned in pairs and project outwardly from the mounting bars 36. The respective side walls 30B of the upper portions 30 of the main deflector members 14 have pairs of aligned holes 38 therethrough which receive the corresponding pairs of studs 34 to pivotally mount the main deflector members 14 from the adjustable mounting band 12. The aligned studs 34 thus define the pivotal axes 28 of the members 14 of the split bucket 26.

It is also advantageous to be able to change the pivotal axes 28 of the main deflector members 14 relative to their centers of gravity in order to change the magnitude of force required from the grain stream impact on the members to overcome the force of gravity on the members 14 and pivotally move the members 14 toward their expanded relation For this purpose, the mounting bars 36 have a plurality of attachment locations in the form of series of aligned threaded holes 40 formed therein, and the side walls 30B of the main deflector members 14 also have corresponding series of holes 42 formed therein The pivotal axes-defining studs 34 can be removed and the main deflector members 14 realigned with the mounting bars 36 so as to allow the studs 34 to be reinserted through the desired ones of the holes 42 and then refastened in the desired ones of the threaded holes 40 to create the desired spaced relations between the pivotal axes 28 and the centers of gravity of the members 14. At the settings of the studs 34 shown in FIG. 3, force required to pivot the members 14 is at a maximum. By moving the settings of the studs 34 away from one another, the force requirement decreases In the contracted relation of the main deflector members 14, the adjacent inner edges 44 of their coplanar side walls 30B, 32B abut one another. However, the inner edges 46 of the bottom walls 32A are still slightly spaced apart (see FIG. 5) so as to produce a narrow opening or gap 48 therebetween. Thus, in the contracted relation, the split bucket 26 of the damper device 10 is substantially shut but not completely closed at its bottom.

In response to forces produced by the flow of significant amounts of grain in the stream A into the split bucket 26, the main deflector members 14 move away from one another, against the force of gravity, toward an expanded relation, from their positions shown in FIG. 3 to that shown in FIGS. 6 and 7, while at the same time slowing the velocity of the grain stream A. A pair of bent guide elements 50 are mounted to the inner upper edge portions of the side walls 30B of the one of the main deflector member upper portion 30 and extend toward and overlap with the corresponding inner upper edge portions of the side walls 30B of the other upper portion 30 so as to maintain the side walls in alignment as the main deflector members 14 pivotally move between their contracted and expanded relations. Whereas grain cannot pass between the side walls 30B, 32B of the main deflector members 14 when the members 14 are in their contracted relation (FIG. 3), as the members 14 pivot away from one another toward their expanded relation (FIG. 6) an inverted V-shaped gap 52 increases in size between the inner edges 44 of the main deflector member side walls which permits passage of grain. The supplementary deflector members 16 are provided to prevent such passage of grain at the side walls 30B, 32B of the main deflector members 14. The studs 34 of the support arrangement 20 also mounts the supplementary deflector members 16 to extend along the sides of the main deflector members 14 at the second pair of sides of the grain stream A to block grain passage. The supplementary deflector members 16 are loosely mounted by the studs 34 so as to avoid wedging of grain between it and the main deflector member side walls. The supplementary deflector members 16 are formed by substantially planar plates positioned for impact with grain to prevent grain flow from the split bucket 26 through the gaps 52 at the second pair of sides upon movement of the main deflector members 14 of the bucket 26 toward their expanded relation in response to impact with grain stream flowing from the spout C.

In the embodiment of FIGS. 3-7, the pair of auxiliary deflector members 18 of the damper device 10 are mounted by the supplementary deflector members 16 to extend below the main and supplementary deflector members 14, 16 and into the grain stream at the second pair of opposite sides of the grain stream A for impact with the grain stream flowing from the split bucket 26. More particularly, the auxiliary deflector members 18 are supported at the lower ends 16A of the respective supplementary deflector members 16 by bent connectors 54 so as to extend at angles therefrom converging downwardly and inwardly toward one another and into the path of the grain stream. Furthermore, the auxiliary deflector members 18 have bent edges 18A at opposite ends of the members which generally align with the bottom walls 2A of the main deflector members 14 when the latter are in their expanded relation, as shown in FIGS. 6 and 7. In the modified embodiment of FIGS. 10-11, the auxiliary deflector members 18 are mounted to the one or the other of the pairs of lower side walls 32B of the main deflector members 14 by connectors 54 and so move with the members 14.

Finally, supplementary biasing means 56 in the form of strip-like anchor elements 58 and a resiliently yieldable expandable member in the form of a coil spring 60 is provided on the split bucket 26. The anchor elements 58 are attached to the main deflector members 14 along one side of the split bucket 26. The spring 60 extends between the anchor elements 58 and has adjustment fasteners 62 interconnecting its opposite ends to the anchor elements 58 for imposing a biasing force on main deflector members 14 which biases them toward their contracted relation. Further, the anchor elements 58 have multiple aligned locations thereon in the form of aligned rows of holes 64 at which to attach the fasteners 62 for changing the length of the moment arm of the spring 60 from the pivotal axes 28 of the members 14 and thereby the magnitude of the biasing force imposed by the spring 60 thereon.

In conclusion, by using the damper device 10 of the present invention, the grain stream A will flow from the discharge spout C under control The damper device 10 interrupts and deflects portions of the grain stream A into each other so as to slow its velocity from the discharge end of the spout C. The grain stream is condensed or consolidated by the damper device 10 and prevented from spreading. It is now more like water being poured through a funnel in a well-defined and contained stream at relatively low velocity instead of a stream which comes out of a high pressure water hose at high pressure. When the damper device 10 is used on a grain discharge spout to load trucks and wagons, the grain does not hit and bounce as it does when using the spout alone. When used on a bin top over a grain spreader, the damper device 10 catches the grain and allows it to flow into the center of the grain spreader and as a result the grain spreader will do a much more effective job of spreading the grain evenly.

The damper device 10 also has an air flow passage 66 defined between the upper portions 30 of the main deflector members 14 and the exterior of the mounting band 12. The passage 66 communicates with the grain stream A flowing from the discharge spout C and induce updrafts of air flow through the passage 66 that separate and route dust and dirt from the grain stream upwardly into the atmosphere instead of in the bin, truck, wagon or on persons working in the area.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

What is claimed is:

1. A damper device for dampening a grain stream flowing from a discharge end of a grain delivery spout, said damper device, comprising:
   (a) means for mounting on the discharge end of the grain spout;
   (b) a bucket for surrounding the grain stream and being composed of a pair of main deflector members;
   (c) a pair of auxiliary deflector members; and
   (d) a support arrangement including first means connected to said mounting means and pivotally mounting said main deflector members to extend below the discharge end of the grain spout and across the grain stream at first and second opposite sides thereof for impact with the grain stream flowing from the spout and to bias said main deflector members for movement toward one another to a contracted relation in absence of the grain stream flowing from the spout while permitting movement of said main deflector members away from one another toward an expanded relation in response to forces imposed thereon by impact with the grain stream flowing from the spout;
   (e) said support arrangement including second means connected either to said first means of said support arrangement or to said main deflector members and mounting said auxiliary deflector members to extend below said main deflector members and into the grain stream at third and fourth opposite sides of the grain stream being oriented in orthogonal relation to the first and second opposing sides thereof for impact with the grain stream flowing from the bucket.

2. The damper device as recited in claim 1, wherein:
   said first means for biasing is in the form of anchor elements attached to said main deflector members and a resiliently yieldable expandable member attached to and extending between said anchor elements for imposing a biasing force on said main deflector members which biases them toward said contracted relation.

3. The damper device as recited in claim 1, further comprising:
   a pair of supplementary deflector members, said first means of said support arrangement mounting said supplementary deflector members to extend along said main deflector members and along the grain stream at the third and fourth sides of the grain stream to prevent flow of grain therefrom when said main deflector members are moved toward their expanded relation in response to impact with grain flowing from the spout.

4. The damper device as recited in claim 3, wherein said auxiliary deflector members are supported at lower ends of said respective supplementary deflector members so as to extend at angles therefrom converging downwardly and inwardly toward one another and into the grain stream at the third and fourth sides.

5. The damper device as recited in claim 3, wherein:
   said first means of said support arrangement includes a pair of aligned outwardly-projecting studs attached to said adjustable mounting means for pivotally mounting each or said upper portions of said main deflector members; and
   said supplementary deflector members are substantially planar plates, each plate being supported along one of the third and fourth sides of the grain stream by corresponding studs in said pairs thereof.

6. The damper device as recited in claim 1, wherein said main deflector members include:
   respective upper portions extending substantially parallel along and about the grain stream flowing from the spout when said main deflector members are in said contracted relation; and
   respective lower portions converging toward one another across the grain stream flowing from the spout when said main deflector members are in said contracted relation.

7. The damper device as recited in claim 6, wherein each of said upper portions of said main deflector members includes an end wall and a pair of side walls connected at opposite edges of said end wall, said end walls of said upper portions being disposed respectively at the first and second sides of the grain stream and extending substantially parallel to one another, said pairs of side walls of said upper portions being disposed respectively at the third and fourth sides of the grain stream with said side walls of each pair extending substantially perpendicular to said end walls and substantially parallel to one another and said side walls of one pair extending substantially coplanar with the corresponding side walls of the other pair, said end walls and side walls defining said upper portions with an overall rectangular configuration when said main deflector members are in said contracted relation.

8. The damper device as recited in claim 7, wherein each of said lower portions of said main deflector members includes a bottom wall and a pair of side walls connected to opposite edges of said bottom wall, said pairs of side walls of said lower portions extending substantially perpendicular to said end walls and being connected to and forming continuations of said pairs of side walls of said corresponding upper portions, said bottom walls of said lower portions being connected to and extending at angles from said end walls of said upper portions so as to converge downwardly and inwardly toward one another at the first and second sides of the grain stream to define said lower portions with a tapered configuration when said main deflector members are in said contracted relation.

9. The damper device as recited in claim 7, wherein:
said first means of said support arrangement includes a pair of aligned outwardly-projecting studs attached to said adjustable mounting means for pivotally mounting each of said upper portions of said main deflector members; and
said pair of side walls of each of said upper portions of said main deflector members having a pair of aligned holes which receive said corresponding pair of studs to pivotally mount said main deflector members from said adjustable mounting, means.

10. The damper device as recited in claim 9, wherein:
said pairs of studs are removably attached to said adjustable mounting means;
said adjustable mounting means has a plurality of attachment locations defined thereon for relocating and reattaching said pairs of studs of different ones of said locations; and
said pairs of side walls of said main deflector members having pluralities of aligned holes for correspondingly changing the location of pivotal mounting of said main deflector members corresponding to the relocation and reattachment of said pair of studs on said adjustable mounting means.

11. A damper device for dampening a grain stream flowing from a discharge end of a grain delivery spout, said damper device, comprising:
(a) adjustable means for mounting on the discharge end of the grain spout;
(b) a bucket for surrounding the grain stream and being composed of a pair of main deflector members;
(c) a pair of supplementary deflector members; and
(d) a support arrangement connected to said adjustable mounting means and pivotally mounting said main deflector members to extend below the discharge end of the grain spout and across the grain stream at first and second opposite sides thereof for impact with the grain stream flowing from the spout and to bias said main deflector members for movement toward one another to a contracted relation in absence of the grain stream flowing from the spout while permitting movement of said main deflector members away from one another toward an expanded relation in response to forces imposed thereon by impact with the grain stream flowing from the spout;
(e) said support arrangement also mounting said supplementary deflector members to extend along said main deflector members and along the grain stream at third and fourth opposite sides of the grain stream to deflect the flow of grain therefrom when said main deflector members are moved toward their expanded relation in response to impact with grain flowing from the spout.

12. The damper device as recited in claim 11, wherein:
said support arrangement includes outwardly-projecting studs attached to said adjustable mounting means for mounting each of said supplementary deflector members; and
said supplementary deflector members at upper ends thereof having holes which receive said studs to mount said supplementary deflector members from said adjustable mounting means.

13. The damper device as recited in claim 11, wherein:
supplementary biasing means in the form of anchor elements attached to said main deflector members and a resiliently yieldable expandable member attached to and extending between said anchor elements for imposing a biasing force on said main deflector members which biases them toward said contracted relation.

14. The damper device as recited in claim 11, further comprising:
a pair of auxiliary deflector members, said supplementary deflector members mounting said auxiliary deflector members to extend below said main and supplementary deflector members and into the grain stream at third and fourth opposite sides of the grain stream being oriented in orthogonal relation to the first and second sides thereof for impact with the grain stream flowing from the bucket.

15. The damper device as recited in claim 14, wherein said auxiliary deflector members are supported at lower ends of said respective supplementary deflector members by bent connectors so as to extend at angles therefrom converging downwardly and inwardly toward one another and into the grain stream at the third and fourth sides thereof.

16. The damper device as recited in claim 11, wherein said main deflector members include:
respective upper portions extending substantially parallel along and about the grain stream flowing from the spout when said main deflector members are in said contracted relation; and
respective lower portions converging toward one another across the grain stream flowing from the spout when said main deflector members are in said contracted relation.

17. The damper device as recited in claim 16, wherein each of said upper portions of said main deflector members includes an end wall and a pair of side walls connected at opposite edges of said end wall, said end walls of said upper portions being disposed respectively at the first and second sides of the grain stream and extending substantially parallel to one another, said pairs of side walls of said upper portions being disposed respectively at the third and fourth sides of the grain stream with said side walls of each pair extending substantially perpendicular to said end walls and substantially parallel to one another and said side walls of one pair extending substantially coplanar with the corresponding side walls of the other pair, said end walls and side walls defining said upper portions with an overall rectangular configuration when said main deflector members are in said contracted relation.

18. The damper device as recited in claim 17, wherein each of said lower portions of said main deflector members includes a bottom wall and a pair of side walls connected to opposite edges of said bottom wall, said pairs of side walls of said lower portions extending substantially perpendicular to said end walls and being connected to and forming continuations of said pairs of side walls of said corresponding upper portions, said bottom walls of said lower portions being connected to and extending at angles from said end walls of said upper portions so as to converge downwardly and inwardly toward one another at the first and second sides of the grain stream to define said lower portions with a tapered configuration when said main deflector members are in said contracted relation.

19. The damper device as recited in claim 17, wherein:

said support arrangement includes a pair of aligned outwardly-projecting studs attached to said adjustable mounting means for pivotally mounting each of said upper portions of said main deflector members; and said pair of side walls of each of said upper portions of said main deflector members having a pair of aligned holes which receives said corresponding pair of studs to pivotally mount said main deflector members from said adjustable mounting means.

20. The damper device as recited in claim 19, wherein:

said pairs of studs are removably attached to said adjustable mounting means;

said adjustable mounting means has a plurality of attachment locations defined thereon for relocating and reattaching said pairs of studs are different ones of said locations; and said pairs of side walls of said main deflector members having pluralities of aligned holes for correspondingly changing the location of pivotal mounting of said main deflector members corresponding to the relocation and reattachment of said pair of studs on said adjustable mounting means.

* * * * *